United States Patent [19]

Crick et al.

[11] Patent Number: 5,285,527
[45] Date of Patent: Feb. 8, 1994

[54] PREDICTIVE HISTORICAL CACHE MEMORY

[75] Inventors: William R. Crick, Ottawa; Walter J. Jager, Kanata; Michael L. Takefman; Randal K. Mullin, both of Ottawa, all of Canada

[73] Assignee: Northern Telecom Limited, Montreal, Canada

[21] Appl. No.: 619,588

[22] Filed: Nov. 29, 1990

[51] Int. Cl.⁵ .................. G06F 12/00; G06F 13/10
[52] U.S. Cl. ..................... 395/425; 395/650; 364/DIG. 1
[58] Field of Search .......... 395/425, 650, 725; 365/49; 364/200 MS File

[56] References Cited

U.S. PATENT DOCUMENTS

| | | | |
|---|---|---|---|
| 4,189,768 | 2/1980 | Liptay et al. | 364/200 |
| 4,594,659 | 6/1986 | Guenthner et al. | 364/200 |
| 4,626,988 | 12/1986 | George | 364/200 |
| 4,722,050 | 1/1988 | Lee et al. | 364/200 |
| 4,881,170 | 11/1989 | Morisada | 364/200 |
| 4,884,197 | 11/1989 | Sachs et al. | 364/200 |
| 4,894,772 | 1/1990 | Langendorf | 364/200 |
| 4,896,264 | 1/1990 | Boddie | 364/200 |
| 4,924,376 | 5/1990 | Ooi | 364/200 |
| 4,942,520 | 7/1990 | Langendorf | 364/200 |
| 5,043,870 | 8/1991 | Ditzel et al. | 395/425 |

Primary Examiner—Alyssa H. Bowler
Attorney, Agent, or Firm—F. P. Turpin

[57] ABSTRACT

A cache memory functioning as a circular buffer for use as a part historical, part predictive cache memory is provided. A first register contains data having a value corresponding to a cache memory location of a last instruction executed by a processor and a second register contains data having a value corresponding to a memory location in the cache memory of a last prefetched instruction. Prefetching of instructions from a main memory to the cache memory is disabled if the difference between the values in the first and second pointer registers exceeds a predetermined amount.

2 Claims, 3 Drawing Sheets

PREDICTIVE HISTORICAL CACHE MEMORY

FIELD OF THE INVENTION

The present invention relates generally to memory systems and more particularly, to a computer system which utilizes a cache memory.

BACKGROUND OF THE INVENTION

Most computer systems include a processor and a memory system. The speed at which the processor can decode and execute instructions to process data has for some time exceeded the speed at which instructions and operands can be transferred from the main memory of the memory system to the processor. In an attempt to reduce the problems caused by a mismatch in speed, many computer systems also include a cache memory between the processor and the main memory.

A cache memory is a small, high-speed buffer memory which is used to temporarily hold a copy of those portions of the contents of main memory which are likely to be used in the near future by the processor. Typically, when the processor requires an instruction, the instruction is fetched from the cache memory or from the main memory via an instruction bus. The main purpose of a cache memory is to shorten the time necessary to perform memory accesses, either for data or instruction fetch. The information located in cache memory may be accessed in much less time than that located in main memory. Thus, a processor with a cache memory needs to spend far less time waiting for instruction and operands to be fetched and/or stored. For example, in typical large, high-speed computers, main memory can be accessed in 300 to 600 nanoseconds; information can be obtained from a cache memory on the other hand, in 30 to 40 nanoseconds. A cache memory which is used to store instructions as they are used by the processor for possible later re-use, is known as an historical cache memory.

Alternatively, a scheme may be implemented whereby instructions are prefetched and stored in a cache memory before they are requested by the processor. Such a scheme is called a predictive cache memory scheme.

Whether an historical or a predictive cache memory scheme is used, the desired objectives are to 1) maximize the probability of finding a main memory reference's information in the cache, 2) minimize the time required to access information that is needed by the processor (access time), and to 3) minimize the delay due to a cache miss. All of these objectives must be accomplished under cost constraints and in view of the interrelationship between the parameters, for example, the trade-off between hit ratio and access time. The probability of finding the needed information in the cache memory is related to its size.

More recently, cache memories have been coupled with instruction prefetch circuits for providing the storage of future processor instruction requests in the cache, before the processor actually issues the request. When instructions are prefetched from a main memory and written to a cache memory, those prefetched instructions may overwrite previously written instructions stored within the cache. This overwriting of previously written instructions with prefetched instructions is in effect replacing an historical portion of the cache memory with a predictive portion. Although in some instances predictive instruction prefetching provides advantages over historical based caching schemes, there exists a need for a hybrid type of caching scheme whereby some of the information is stored on a predictive basis and some of the information is stored on an historical basis. In most computers, instructions are stored in a main memory in the order that they will be executed. Whereas this order is typically sequential, the instruction flow is often interrupted by conditional and unconditional branch instructions. A register termed the program counter resides in the processor and is incremented at the execution of each instruction and it also stores the address of the next instruction to be executed. When an unconditional branch instruction is executed, the program counter is loaded with the branch target address and the instruction corresponding to the branch target address, the target itself, is executed. After the processor has determined the result of a conditional branch instruction, the program counter will either be loaded with the branch target address or will be loaded with the next sequential address of the instruction following the address of the conditional branch instruction depending on whether or not the condition was satisfied.

Recently, some prefetch circuits have been designed to provide additional functions which enhance the function of prefetching sequential instructions. One such enhancement allows a prefetch circuit to first determine if a current prefetched instruction is a branch instruction. A subsequent prefetched instruction may be the branch target address or may contain the branch target itself. However, when a conditional branch instruction is decoded, the prefetch circuit may not have the necessary information available to determine which path to take because the result of the condition of the conditional branch is not known by the prefetch circuit and thus, a conditional branch may yield an incorrectly prefetched subsequent instruction. By having a part historical, part predictive cache memory, the chance of a cache hit is increased in the instance that a prefetch sequence includes a conditional branch instruction. If the predictive portion of the cache memory does not contain the required instruction due to an incorrectly prefetched instruction, the historical portion of the cache memory may contain the required instruction.

It is thus an object of the invention to improve the performance of a cache memory operation in association with a processor.

It is a further object of the invention to improve the performance of a cache memory by providing a part historic part predictive cache memory system.

SUMMARY OF THE INVENTION

In accordance with the invention, a memory system includes a content addressable cache memory functioning as a part predictive, part historical buffer. Instructions are stored in the cache memory sequentially and are retrieved in a fully associative manner. A plurality of pointer registers are maintained in a logic circuit whereby the content of one of the pointer registers corresponds to a last instruction pointer and the content of another of the pointer registers corresponds to a memory address corresponding to a location sequentially following a last prefetched instruction. When the processor requires an instruction, an attempt is made to retrieve it from the cache memory, and, if it is not found, it is retrieved from a main memory and stored in the cache memory. The stored instruction is then provided to the processor from the cache memory. Alternatively, if a direct bus is provided between the main memory and the processor, the retrieved instruction may be simultaneously provided to the cache memory and to the processor.

In accordance with an aspect of the invention there is provided a method of maintaining a content addressable cache memory as a circular buffer for use as a part predictive, part historical cache memory whereby instructions are stored in the cache memory in a sequential manner and the stored information units may be retrieved from the cache memory by a processor, the method comprising the steps of:

(a) prefetching instructions which may be requested by the processor and sequentially storing them in the cache memory;

(b) maintaining a set of pointer registers wherein a first pointer register in the set contains word having a value which corresponds to a location in the cache memory which held the last instruction provided to the processor from the cache memory, and wherein a second pointer register in the set contains a word having a value which corresponds to a cache memory location indexed ahead by one location from where a last prefetched instruction was stored in the cache memory;

(c) retrieving a requested instruction from the cache memory and providing it to the processor;

(d) retrieving the requested instruction from the main memory if the requested instruction was not found in step (c);

(e) storing the requested instruction in the cache memory and providing the instruction to the processor;

(f) repeating steps (b) to (e) and omitting step (a) when the difference between the values in the first and second pointer registers exceeds a predetermined amount.

In accordance with another aspect of the invention a memory system for use in a switching system having a processor is provided. The memory system comprises a main memory for storing units of information including instructions, a cache memory for temporarily storing instructions therein, a logic circuit including a plurality of pointer registers wherein a first pointer register is for containing data having a value which corresponds to the cache memory location which held the last instruction provided to the processor from the cache memory, and a second pointer register is for containing data having a value which corresponds to a cache memory location incremented by one location from where a last prefetched instruction was stored therein. The memory system also comprises a prefetcher circuit, operable to fetch instructions in response to requests from the processor and is operable to prefetch an instruction if the difference between the values in the first and second pointer registers does not exceed a predetermined amount whereby the cache memory is maintained as a part historical, part predictive cache memory.

BRIEF DESCRIPTION OF THE DRAWINGS

An embodiment of the invention will be described with reference to the accompanying drawings in which:

Referring to FIG. 1, there is shown a processor 10 for executing instructions received from a cache memory 30 on a data bus 18. The processor may be a reduced instruction set computer (RISC) processor as is well known in the art, such as the MC88100 processor commercially available as an off-the-shelf component.

Figure 1:
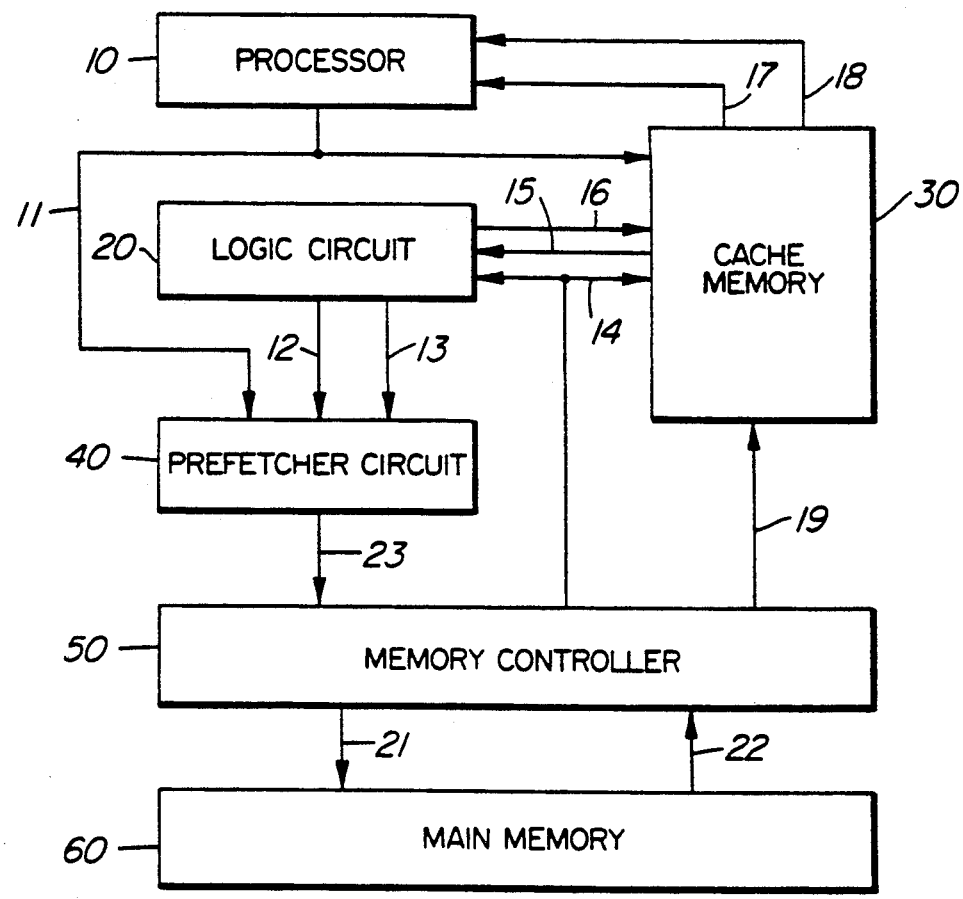
FIG. 1 is a schematic block diagram of a computer system having a hierarchical memory system in accordance with the invention.

The cache memory 30 is a small, high speed, part historical, part predictive buffer memory. A control line 17 is provided for carrying a cache control signal to the processor for indicating a cache hit or a cache miss. A logic circuit 20 is connected to the cache memory 30 and to a prefetcher circuit 40 for providing control signals thereto. The logic circuit 20 will be described in greater detail in conjunction with FIGS. 4a, 4b, and 4c. The primary function of the prefetcher circuit 40 is the retrieval of instructions from a main memory 60 and the writing of them into the cache memory 30 in advance of requests for those instructions from the processor 10. The prefetcher circuit 40 is responsive to a cache miss signal on control lead 12 generated by the logic circuit 20 to retrieve units of information from the main memory 60 if a cache miss occurs.

The main memory 60 is typically very large and of the type which is constructed of components which are relatively economical but slow in operation in comparison to the speed of operation of the processor. A memory controller 50 is responsive to signals from the prefetcher circuit 40 for receiving memory addresses and for writing the cache memory 30 with instructions from the main memory 60. The main memory 60 receives requests for data retrieval on lead 21 and outputs data to the memory controller 50 on lead 22.

Some advantages may be achieved by implementing a separate data bus for carrying instructions from the memory controller 50 to the processor 10 directly. However, in the particular embodiment shown in FIG. 1, instructions residing within the main memory 60 are first stored within the cache memory 30 before being subsequently provided to the processor 10.

In operation, the processor 10 requests and processes instructions fetched from the cache memory 30. If a requested instruction is stored in the cache memory 30, the instruction is provided directly to the processor 10. Alternatively, if the instruction is not found within the cache memory 30, the logic circuit 20 asserts a cache miss signal on lead 12. Consequently, the prefetcher circuit 40 fetches the instruction from main memory 60 and the memory controller 50 subsequently writes it into the cache memory 30. Such an instruction fetch takes several clock cycles and the processor must wait for it to be completed. However, while the processor is waiting and if the prefetch signal on lead 13 remains asserted, the prefetcher circuit initiates the prefetching of instructions from main memory. After the requested instruction has been written in the cache, it is provided to the processor 10 on lead 18. As each prefetched instruction becomes available from main memory 60 on lead 22, the instruction is subsequently written into the cache memory 30 via data bus 19. The main function of the prefetcher circuit is to prefetch instructions to the cache memory before they are required by the processor. Thus, the cache memory 30 may contain unread prefetched instructions which have not yet been provided to the processor 10 and it may contain previously read instructions which have been provided to the processor and which may be subsequently read again by the processor 10. That portion of the cache memory 30 containing unread instructions is termed the predictive portion of memory. The remaining portion of the cache memory containing previously read instructions is termed the historical portion of the cache memory 30. As will be discussed with specific reference to FIGS. 3 and 4, the cache memory 30 may be managed as a part historical, part predictive cache memory.

Figure 2:
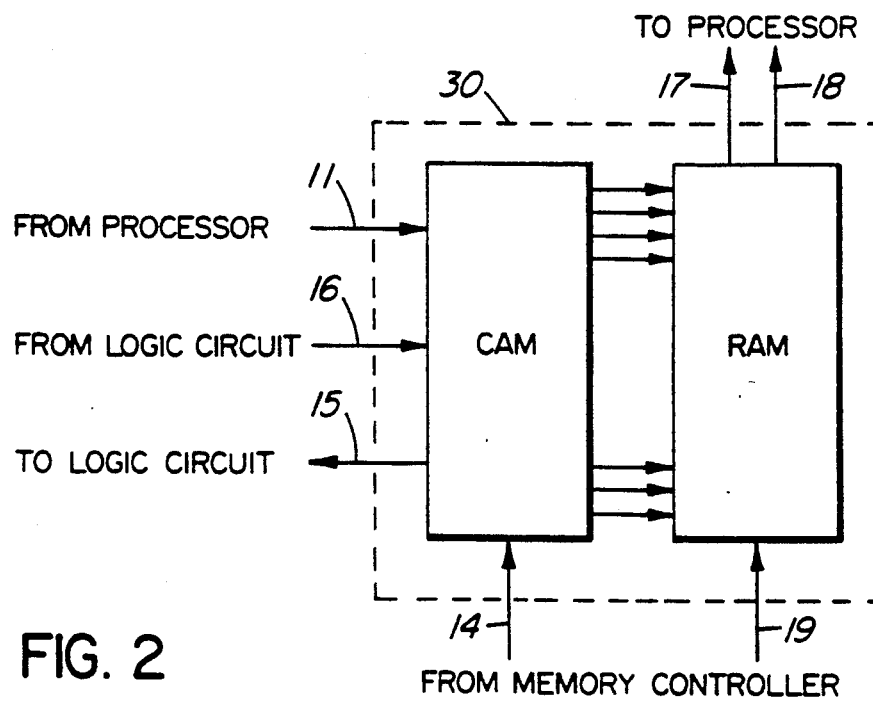
FIG. 2 is a schematic block diagram of the cache memory shown in FIG. 1.
Figure 3A:
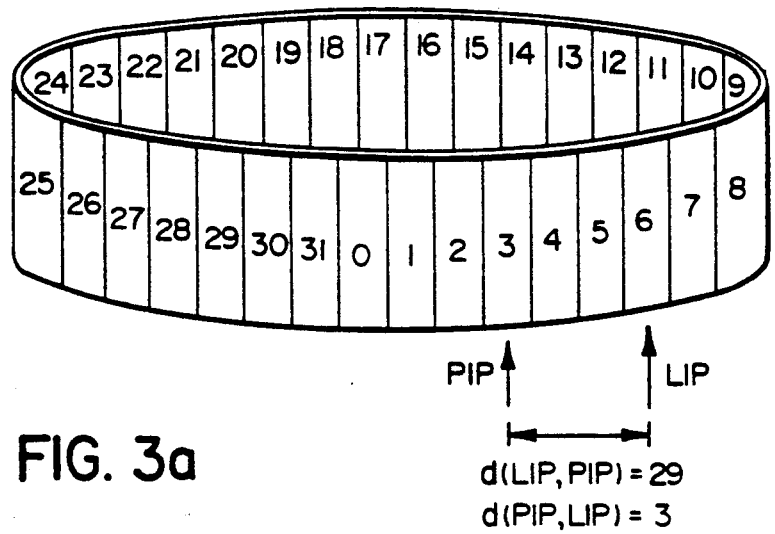
FIGS. 3a, 3b, and 3c are diagrams depicting various operational aspects of the cache memory illustrated in FIG. 2.
Figure 3B:
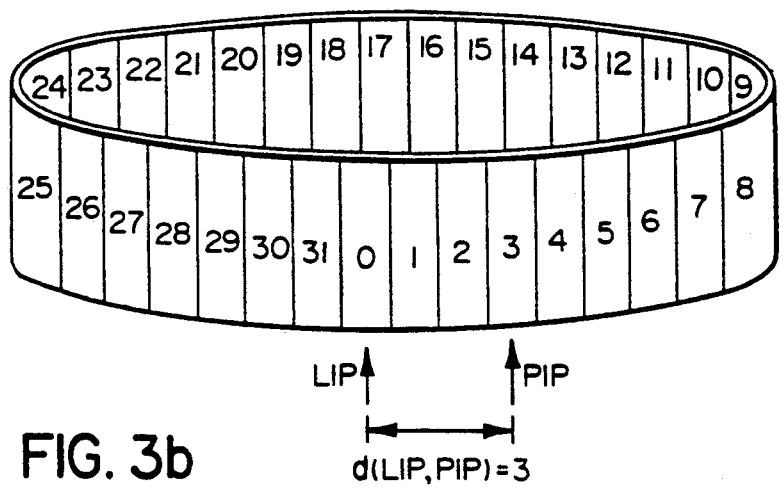
Figure 3C:
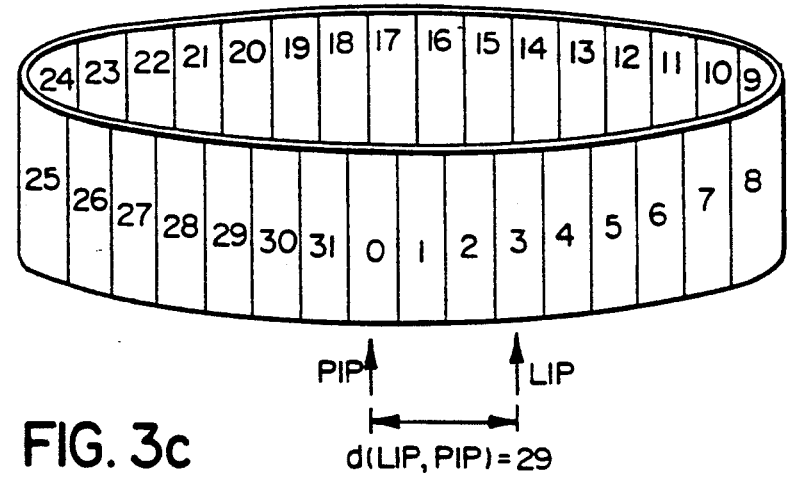

The cache memory 30 is shown in greater detail in FIG. 2; it comprises a thirty-two location content addressable memory (CAM) for containing tag addresses, and a random access memory (RAM) for containing a copy of the instructions at those tag addresses in main memory 60. As indicated above, the operational characteristics of the cache memory 30 as a circular buffer may be better understood with reference to FIGS. 3a, 3b, and 3c. In order to manage the cache memory 30 as a circular buffer, two pointer registers shown by arrows labelled LIP and PIP in FIGS. 3a, 3b, and 3c are maintained within the logic circuit 20. The first of these registers is a last instruction pointer register (LIP) which contains a value corresponding to a cache memory location of the last executed instruction. The second register is a prefetch instruction pointer (PIP) register which contains a value corresponding to a cache memory location following the memory location of the last prefetched instruction. As is shown in FIGS. 3a, 3b, and 3c, memory location 0 is adjacent to location 1 which is adjacent to location 2, and so on sequentially up to memory location 31.

The PIP begins pointing at location 0, then 1, and sequentially points to all locations up to location 31 as they are written with fetched or prefetched instructions. After the PIP points to location 31 it wraps around and sequentially begins pointing to location 0 and is incremented from location 0 in increments of one location. The implementation of the PIP will be discussed later in conjunction with FIG. 4a. The method of maintaining a pointer register which repeatedly counts from 0 to 31 converts a sequentially addressed random access memory (RAM) to a circular buffer.

Referring to FIG. 3a, a wheel representing a circular cache memory is shown having 32 memory locations. The PIP is shown pointing to location 3 and the LIP pointing to location 6, thus the last prefetched instruction is stored in location 2 and the last instruction executed by the processor is stored in location 6. Since instructions are not always executed in their sequential order from main memory or from their sequential placement in the cache memory due to branch instructions, the LIP may be moved anywhere within the cache memory. Since retrieval of instructions is performed associatively from the cache memory the LIP may point at any of the 32 locations within the cache. The PIP however, after pointing at location 3, would point to location 4. To prevent the historical part of the cache memory from being completely overwritten with prefetched instructions, whenever possible, the PIP is kept at least a predetermined minimum distance away from the LIP. When the LIP and the PIP are equal or closer than the predetermined minimum distance prefetching is disabled until the distance between the PIP and the LIP exceeds the predetermined minimum. Unused prefetched instructions are thus prevented from being overwritten with new prefetched instructions.

The value of the predetermined minimum distance is a function of the desired partitioning of the cache memory into predictive and historical portions. The predictive portion of the cache memory is proportional to the distance between the LIP and the PIP. For example, in FIG. 3a, the distance between the LIP and the PIP is 29 whereas in FIG. 3b, the PIP is shown to be ahead of the LIP by 3 locations. Thus, the historical portion of the cache memory in FIGS. 3a and 3c is 4 locations, and the predictive portion is 28 locations. On the other hand, the historical portion of the cache memory in FIG. 3b is 30 locations and the predictive portion is 2 locations.

Figure 4:
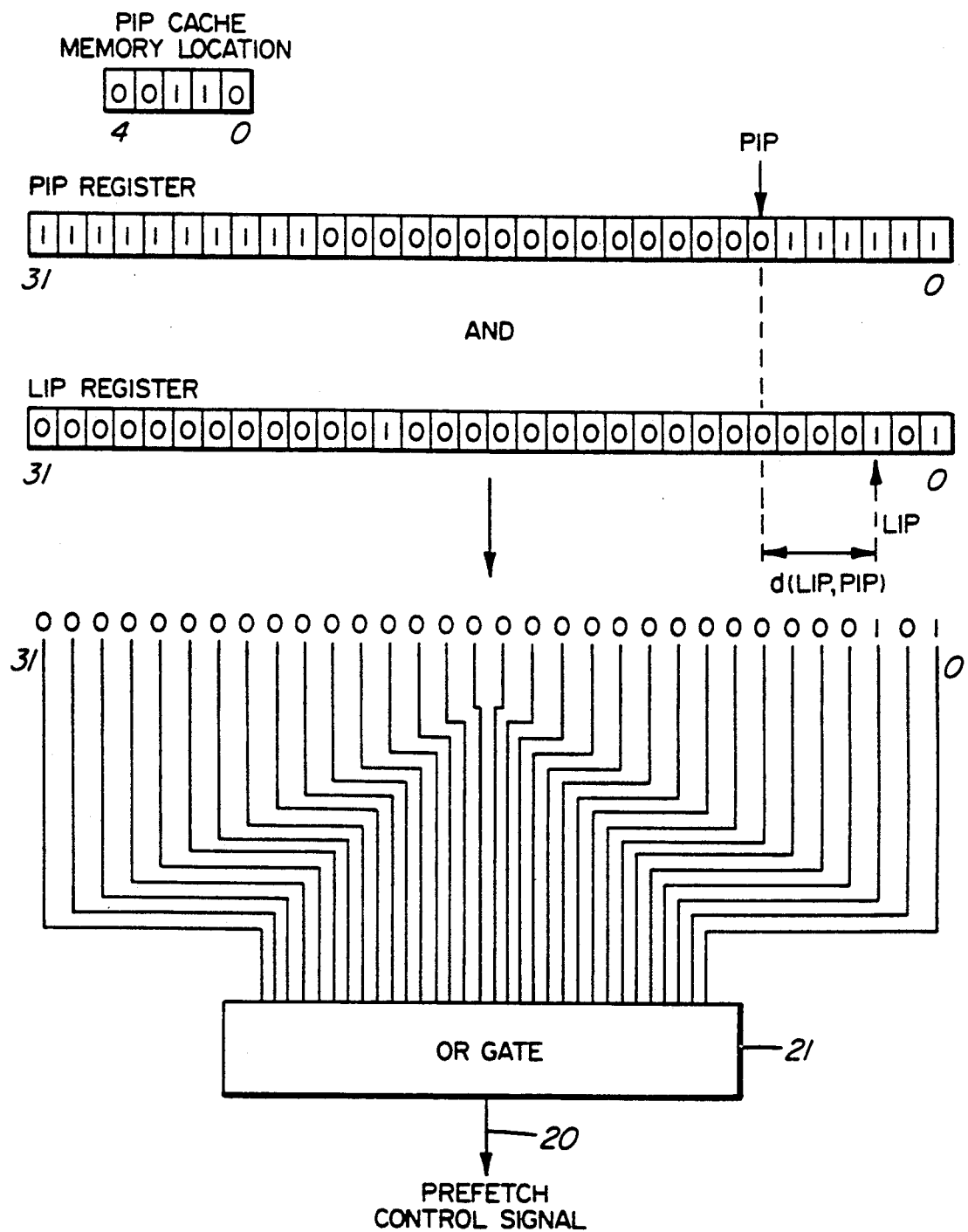
FIG. 4 is a logic diagram of a plurality of registers illustrating the operation of the cache memory shown in FIG. 2.

FIG. 4 shows two 32-bit registers which represent the PIP and the LIP respectively. The PIP register has 16 contiguous bits which are set to the value one adjacent 16 contiguous bits which are set to the value zero. Incrementing the PIP is achieved by shifting the content of the register in a recirculating manner one position to the left. The memory location that the PIP points to at any given time is the bit position having a value of zero that is immediately to the left of and adjacent to the contiguous bits having a value of one. In the instance that the most significant 16-bit positions have values of one, the PIP points to the least significant bit position of the 32-bit register. For example, the PIP register in FIG. 4 is pointing to memory location 6 in the cache memory.

The LIP register has 32 bit positions which contain one-bits in positions corresponding to cache hits within the tag portion of the cache memory 30. For example the LIP register in FIG. 4 has one-bits in bit positions 0,2, and 19 corresponding to a cache hit at 3 memory locations within the cache memory. Logically ANDing the value of the bits in the PIP register with the value of the bits in the LIP register at the corresponding locations provides a 32-bit word. If the latter contains at least one one-bit the prefetcher circuit 40 is allowed to prefetch instructions from main memory. When the 32-bit word contains all zero-bits, prefetching is prevented. As indicated in FIG. 4, the prefetch control signal may be generated by logically ORing all the bits of the 32-bit word with an OR gate 21. In FIG. 4, the PIP register is shown having 16 contiguous bits set to zero and 16 contiguous bits set to one in the available 32 bit locations. Such an arrangement provides for a cache memory which is 50 percent historical, 50 percent predictive cache memory whenever possible. Since the LIP points to a location where a cache hit occurred, and such an event is a random event, the LIP and the PIP may become closer to each other than the predetermined distance. In such an event prefetching is disabled when the distance between the LIP and the PIP exceeds the predetermined minimum distance. A PIP register having a greater number of one-bit values than zero bit values provides a scheme whereby the cache memory has a larger predictive portion than historic portion. In the instance where one-bit values were significantly more than zero-bit values, the cache memory will be more predictive than historic. The effect of the zeros in the PIP register is to disable prefetching when the PIP becomes a minimum predetermined distance from the LIP. The number of zeros in the PIP corresponds to the minimum predetermined distance.

In FIG. 4 a PIP cache memory location register holds a value corresponding to the location of the PIP in the 32 bit register. This 5 bit value also corresponds to an address in the cache memory where the next prefetched instruction will be stored. PIP control lines 16 couple the 5-bit register with the cache memory 30.

In operation, the processor requests an instruction by asserting and transmitting address bits on address bus 11. The asserted address bits correspond to an address in the main memory 60 where the requested instruction is stored. The address bits may also correspond to an address within the tag portion of the cache memory 30. Both the prefetcher circuit 40 and a portion of the cache memory 30 receive the address bits for comparison with the tag address bits in the cache memory 30.

If there is a cache hit -the address is found to match the tag address- the associated instruction stored in the RAM is provided on data lines 17 to the processor 10. The LIP register shown in FIG. 4, is then updated with information corresponding to the locations in the cache memory of the cache hit. It is possible for the requested instruction to be stored in more than one cache memory location. After the LIP register has been updated, the logic circuit 20 determines whether the prefetcher circuit 40 may continue prefetching instructions as described above.

If a cache miss occurs, the logic circuit 20, in response to signals received from the cache memory 30 on LIP control leads 15, signals the prefetcher circuit 40 via a cache miss control signal lead 12, that a fetch must ensue, as there has been a miss. The prefetcher circuit 40 then provides the memory controller 50 with the address of the requested instruction via address bus 23. In response, the memory controller 50 accesses main memory 60 which returns the requested instruction to the cache memory 30 via the memory controller 50 on data busses 22 and 19. The instruction is written into the cache memory at the location pointed to by the PIP when the signal on lead 14 is asserted. The PIP register provides the cache memory 30 with a 5-bit PIP value on PIP leads 16. The memory controller simultaneously provides a signal on control lead 14 which signals the logic circuit 40 to increment the PIP register and signals the logic circuit 40 to increment the PIP register.

In the embodiment of the invention described above, the PIP has been described as incremented one location ahead of the location of the last prefetched instruction. Of course it should be realized that the PIP may be incremented at a later time and instead, may point to the last prefetched instruction.

Numerous other modifications, variations and adaptations may be made to the particular embodiment of the invention described above without departing from the scope of the claims.

We claim:

1. In a system having a processor and a memory system which includes a part predictive part historical cache memory, a method of halting the prefetching of instructions to the cache memory when the ratio of the predictive part to the historical part of the cache memory becomes greater than a predetermined ratio, the method comprising the steps of:

maintaining a first register which contains a word having a value which defines a first pointer to a location in the cache memory which held a last instruction provided to the processor from the cache memory; and maintaining a second register having a predetermined number of contiguous zero-bits and having a predetermined number of one-bits forming a word, a ratio of the number of zero-bits to the number of one-bits corresponding to a desired ratio of the historical to predictive parts of the cache memory, the bit position having a value of zero that is immediately to the left of and adjacent to the contiguous bits having a value of one, corresponding to a location in the cache memory incremented by one location from where a last prefetched instruction was stored in the cache memory;

ANDing each bit of the first register with each respective bit of the second register to yield an ANDed word having a number of bits corresponding to the number of bit positions of the first and second registers;

ORing each of the bits of the ANDed word to yield a single bit value corresponding to a prefetch control signal; and halting prefetching of instructions when the prefetch control signal has a zero value.

2. In a switching system having a processor, a main memory, and a cache memory for temporarily storing instructions, a circuit for maintaining a cache memory as a part historical, part predictive circular buffer, the circuit comprising:

a logic circuit including a plurality of pointer registers including a first pointer register for containing a word having a value which is expressed in a predetermined number of bits and defines a first pointer indicating a first location in the cache memory which held a last instruction provided to the processor from the cache memory, and a second pointer register for containing a word having a value which is expressed in a predetermined number of bits and defines a second pointer indicating a second location in the cache memory where a last prefetched instruction was stored, the logic circuit further monitoring if a positional difference between the first and second pointers exceeds a predetermined amount; and a prefetching circuit responsive to control signals from the processor and the logic circuit for fetching instructions upon requests from the processor and for prefetching instructions from the main memory to the cache memory upon requests from the logic circuit wherein the prefetching circuit is prevented from performing the prefetching by the logic circuit when the positional difference between the first and second pointers exceeds the predetermined amount;

wherein the value of the word in the second pointer register is expressed in a preset number of binary bits which have a predetermined number of contiguous zero bits and a predetermined number of one-bits, the number of zero bit values to the number of one-bit values being adjustable and corresponding to a desired relationship between the historical part and the predictive part of the cache memory.

* * * * *